Feb. 15, 1949.    R. W. SUTTON    2,461,941
FOLDING GAFF
Filed April 15, 1946
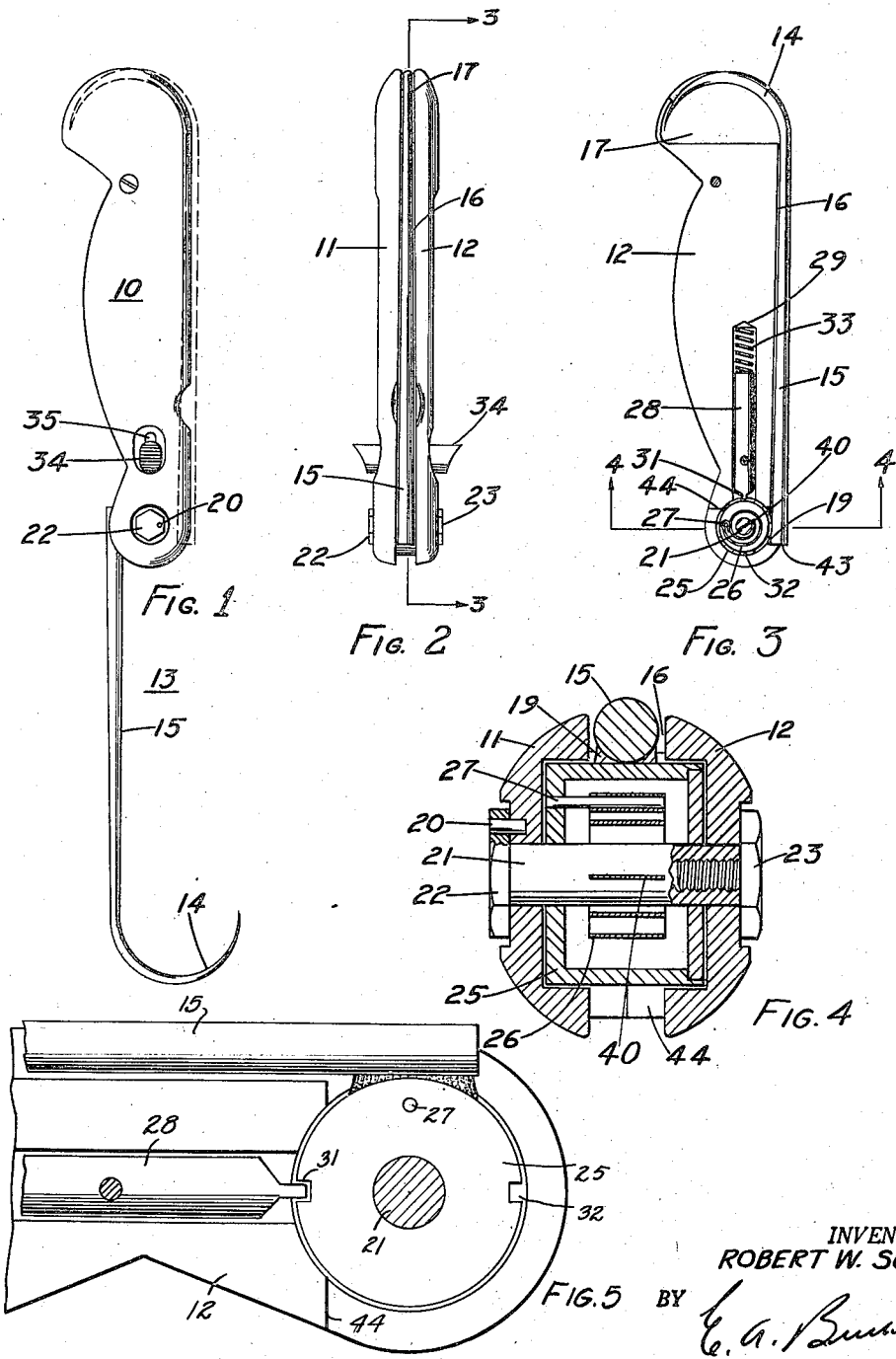
INVENTOR.
ROBERT W. SUTTON
BY
ATTORNEY Patented Feb. 15, 1949

2,461,941

UNITED STATES PATENT OFFICE 2,461,941

FOLDING GAFF

Robert W. Sutton, Milwaukie, Oreg.

Application April 15, 1946, Serial No. 662,268

1 Claim. (Cl. 43—5)

The present invention relates to a folding gaff. It is particularly concerned with a folding gaff for use in securing heavy fish, the gaff being so constructed that the hook portion can be folded into and sheathed by the handle or grip when the gaff is not being used.

A general object of the invention is to provide a new and improved folding gaff.

Another object of the invention is to provide a gaff comprising a handle portion and a hook portion, the hook portion being adapted to be folded into the handle portion and enclosed and protected thereby.

A further object of the invention is to provide a folding gaff in which the hook member is normally folded into sheathed relationship with the handle, the hook member being readily releasable for movement to an open and operative position.

A further object of the invention is to provide a new and improved folding gaff of simple and rugged construction. A still further object is to provide a folding gaff including means for securing the hook portion in folded relationship within the handle and means for biasing the hook to an open position on release of said locking means.

Additional objects and features of the invention will become apparent from the following description thereof and with reference to the accompanying drawing in which:

Fig. 1 is a side elevational view of the folding gaff with the hook in an open and operative position;

Fig. 2 is a front elevational view of the device with the hook folded into the handle portion;

Fig. 3 is a cross sectional view taken along the line 3—3 of Fig. 2; and

Fig. 4 is an enlarged sectional view taken along line 4—4 of Fig. 3.

Fig. 5 is an enlarged view of one end of the unit taken along the line 3—3 of Fig. 2 except that the spring drum is shown in full.

Briefly described the folding gaff of the present invention comprises a grip having a groove extending along the face of the grip and a recess in one end thereof adapted to receive respectively the shank and recurvate portions of the hook. Means at the other end of the grip for pivotally securing the hook member thereto includes a shaft extending through the grip and a cylindrical or drum-shaped member rotatably supported on the shaft, the end of the shank portion of the hook being secured tangentially to the periphery of the drum-shaped member. Spring means positioned within the drum-shaped member serves to bias the hook to a normally open position. Means for locking the hook in either a closed or folded position or in the open position are provided in the form of a detent arranged within the handle portion of the device operatively to engage in suitable notches provided in the outer surface of the drum-shaped member.

In the embodiment of the invention shown in the accompanying drawing numeral 10 indicates a handle or grip which for convenience may be composed of two sections 11 and 12 forming respectively the opposite sides of the handle 10. A gaff hook 13 including a pointed recurvate or hook portion 14 and a shank 15 is secured to one end of the grip 10 for pivotal movement between an open position wherein the hook extends outwardly in line with the handle 10 and a closed position where the hook is folded into the handle. The handle sections 10 and 11 are cut away on their facing sides as indicated in Fig. 3 at 16 along one edge and at 17 on the end opposite the pivotal mounting for the hook 13. In the assembled relation of the handle sections, the cutaway portions 16 define a groove extending longitudinally of the face of the handle and the cutaway portions 17 define an enlarged recess in the other end of the handle to receive respectively the shank and recurvate portions of the hook so that in the closed position the hook is folded into and sheathed by the handle.

Means for pivotally securing the hook member to one end of the handle includes a shaft in the form of a stud 21 extending through the handle, the stud having a head portion 22 at one end thereof, the other end being internally threaded for receiving a cap screw 23. A pin 20 inserted through a suitable aperture in the head portion 22 of the stud and into a cooperating opening in the adjacent side of the handle 10 serves to prevent rotation of the stud with respect to the handle. A drum 25 is axially mounted on the stud 21 within a cooperating recess in the handle 10 for rotational movement about the stud. The end of shank 15 of the hook member is welded tangentially to the outer circumference of the drum 25 as indicated at 19, the drum being of such diameter that the shank 15 will rest in groove 16 when the gaff hook is folded to a closed position within the grip.

When not in use, the hook will ordinarily be folded into sheathed position within the handle to preclude accidental injury by or damage to the hook member, and will be locked in this position by means including a detent 28 positioned in a cylindrical hole 29 extending longitudinally into one end of the handle 10 in operative position with regard to the drum 25. In order that the hook may be readily and quickly opened to an operative position, the device is so constructed that the hook and drum assembly are biased to an open position by means of a coil spring 26 operatively arranged within the drum 25 so that on release of the locking means, the hook will immediately swing about the stud 21 to its operative position. In the illustrated modification the inner end 40 of spring 26 is anchored in a transverse slot in stud 21 while the outer end of the spring is secured relative to the drum 25 adjacent the periphery thereof by means of a pin 27.

The locking arrangement including detent 28 is designed to lock the hook in either the folded or the open position by engagement of the tapered forward end of the detent with transverse notches 31 or 32 provided at diametrically opposite points on the drum 25, each of the notches being positioned 90° away from the point at which the hook shank 15 is secured to the drum. The engagement of the detent 28 with notch 31 secures the hook in a folded position within the handle 10 while similar engagement of the detent 28 with notch 32 locks the hook in an open position and prevents accidental closing thereof during use. In the open position the end face 43 of the shank 13 contacts shoulder 44, which shoulder serves to preclude further pivotal movement of the hook and firmly supports the hook with respect to the grip when in the open position. A spring 33 positioned behind the detent 28 biases the detent into contact with the drum 25 while a pair of thumb pieces 34 secured to opposite sides of the detent through slots 35 in the opposite sides of the handle provide means for manually releasing detent 28 from locking engagement with the notches 31 or 32.

From the above it will be seen that there has been provided by the present invention a simple and rugged foldable gaff wherein the hook portion is adapted to be folded into sheathing engagement with the handle when the hook is not in use, the device being so designed that the hook can be opened to an operative position merely by grasping the grip of the folded hook between the palm and fingers of one hand and releasing the detent by means of the thumb of the same hand.

Having described the invention in what are considered to be certain preferred embodiments thereof, it is desired that it be understood that the specific details shown and described herein are merely illustrative and that this invention may be carried out by other means.

What I claim is:

A folding gaff comprising a pair of similar, elongated, cooperating members forming a handle having an enlarged end, facing portions of each of said members being cut away to form a longitudinal groove in one edge of said handle extending the full length thereof and a recess in said enlarged end communicating with said groove, a stud securing said members together at one end opposite said enlarged end, the facing surface portions of said handle members having aligned cooperating recesses about said stud, a drum rotatably mounted on said stud and arranged within said last mentioned recesses in said members, a hook unit including a shank portion and a recurvate hook portion, the end of said shank portion being secured tangentially to said drum and being pivotally movable about said stud between open and closed positions, the end of said shank portion defining a stop for engaging said handle in the open position of said hook, said shank and hook portions of said hook unit being received in said groove and said recess in said enlarged end in the closed condition of said hook unit, facing surfaces of said handle members having aligned grooves adjacent said drum, a detent arranged within said aligned grooves, said drum having notches for engagement by said detent in the open and closed positions of said hook unit, actuating means secured to said detent extending from each of the opposite sides of said handle whereby said detent may be disengaged from said drum, and spring means arranged within said drum biasing said hook unit to open position.

ROBERT W. SUTTON.

REFERENCES CITED

The following references are of record in the file of this patent:

UNITED STATES PATENTS

| Number | Name | Date |
| --- | --- | --- |
| 274,570 | Davis | Mar. 27, 1883 |
| 453,776 | McCory | June 9, 1891 |
| 557,760 | Brauer | Apr. 7, 1896 |
| 969,909 | Schrade | Sept. 13, 1910 |
| 1,258,632 | Harris | Mar. 5, 1918 |